US009241129B2

(12) United States Patent
Shen et al.

(10) Patent No.: US 9,241,129 B2
(45) Date of Patent: Jan. 19, 2016

(54) VIDEO CALLS FOR EXTERNAL NETWORKS

(71) Applicant: AASTRA TECHNOLOGIES LIMITED, Concord (CA)

(72) Inventors: Francis Shen, Concord (CA); Paulo Francisco, Concord (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 159 days.

(21) Appl. No.: 13/756,065

(22) Filed: Jan. 31, 2013

(65) Prior Publication Data
US 2013/0201280 A1 Aug. 8, 2013

Related U.S. Application Data

(60) Provisional application No. 61/592,848, filed on Jan. 31, 2012.

(51) Int. Cl.
| | |
|---|---|
| *H04N 7/14* | (2006.01) |
| *H04M 7/00* | (2006.01) |
| *H04L 12/18* | (2006.01) |

(52) U.S. Cl.
CPC ............ *H04N 7/147* (2013.01); *H04L 12/1818* (2013.01); *H04M 7/0039* (2013.01)

(58) Field of Classification Search
None
See application file for complete search history.

(56) References Cited

U.S. PATENT DOCUMENTS

| | | | |
|---|---|---|---|
| 2004/0239754 A1 | 12/2004 | Shachar et al. | |
| 2005/0030901 A1* | 2/2005 | Acharya et al. | ............... 370/248 |
| 2005/0030910 A1* | 2/2005 | Robertson et al. | ............ 370/276 |
| 2005/0089018 A1* | 4/2005 | Schessel | ....................... 370/352 |
| 2007/0110033 A1 | 5/2007 | Tu et al. | |
| 2007/0257983 A1 | 11/2007 | Miali | |
| 2008/0049725 A1 | 2/2008 | Rasanen | |
| 2008/0309753 A1* | 12/2008 | Karnalkar et al. | ......... 348/14.11 |
| 2012/0019609 A1 | 1/2012 | Chang et al. | |
| 2013/0018788 A1* | 1/2013 | Johnson et al. | .................. 705/43 |
| 2013/0083156 A1* | 4/2013 | Forkner et al. | ............. 348/14.08 |
| 2013/0147906 A1* | 6/2013 | Weiser et al. | .............. 348/14.09 |

* cited by examiner

*Primary Examiner* — Maria El-Zoobi

(57) ABSTRACT

A method for setting up a video communication session via an Internet Protocol (IP) network between a first correspondent and a second correspondent, the method having the steps of: the first correspondent placing a call through a public switched telephone network (PSTN) to the second correspondent to establish a PSTN communication session; the first correspondent sending a compatibility request via in-band signals to determine compatibility with the first correspondent for video communication; prompting the second correspondent to accept or decline an invitation for the video communication session; exchanging setup information via the PSTN for setting up the video communication session when the second correspondent accepts the invitation, the setup information comprising attributes of each of the correspondents; and setting up the video communication session via the IP network and terminating the PSTN communication session.

5 Claims, 3 Drawing Sheets

VIDEO CALLS FOR EXTERNAL NETWORKS

CROSS-REFERENCE TO RELATED APPLICATIONS

This application claims the benefit of priority to U.S. Provisional Application Ser. No. 61/592,848, filed on Jan. 31, 2012.

FIELD OF THE INVENTION

The present invention relates to video-based communication systems.

DESCRIPTION OF THE RELATED ART

Video is becoming increasingly important to unified communications, and is especially gaining in popularity as a means for real-time communications. Exemplary solutions for video communication include Skype from Skype Inc., Luxembourg, Facetime™ from Apple Inc., Cupertino, Calif., U.S.A., Movi™ from Cisco Systems Inc., San Jose, Calif., U.S.A. and Microsoft Office Communications Server™ (OCS) from Microsoft, Redmond, Wash., U.S.A. However, these various consumer and enterprise video-based communication systems are generally suitable for participants subscribing to a common video based communication system, and having the same call control protocol. For the consumer market, this is not as much an issue as the system is one large network and all participants are registered with the same call control protocol, e.g. Skype. However, enterprise communication typically involves private networks focused on internal staff communications within one company, and therefore communication between two different companies requires additional resources, and may be limited. For example, even if two companies both use the same communication system, e.g. Microsoft OCS, then individuals at the two companies can only communicate with each other via video only if a communication bridge has been set up at both company sites.

Another challenge in setting up a video communication session between two parties is determining whether there is compatibility between the endpoints and determining the video capabilities of the endpoints. Also, despite the parties having compatible endpoints with the desired video capabilities and specifications, it is often difficult for the endpoints to discover each other on the network and set up a video call through their respective firewalls at either site. The set-up process is further complicated by time-consuming firewall/NAT traversal configurations, which often leads to unsuccessful connections.

It is an object of the present invention to mitigate or obviate at least one of the above-mentioned disadvantages.

SUMMARY OF THE INVENTION

In one of its aspects, there is provided a method for setting up a video communication session via an Internet Protocol (IP) network between a first correspondent and a second correspondent, the method having the steps of:

said first correspondent placing a call through a public switched telephone network (PSTN) to said second correspondent to establish a PSTN communication session;

said first correspondent sending a compatibility request via in-band signals to determine compatibility with said first correspondent for video communication;

prompting said second correspondent to accept or decline an invitation for said video communication session;

exchanging setup information via said PSTN for setting up the video communication session when said second correspondent accepts said invitation, said setup information comprising attributes of each of said correspondents; and setting up said video communication session via said IP network and terminating said PSTN communication session.

In another of its aspects, there is provided a method for setting up a video communication session via an Internet Protocol (IP) network between a first correspondent and a second correspondent, the method having the steps of:

providing a call server on an IP network, said call server configured to facilitate said video communication session between said correspondents;

assigning a unique identifier to each of said correspondents;

registering said unique identifier and at least one attribute associated with each of said correspondents with said call server;

said first correspondent placing a call through a public switched telephone network (PSTN) to said second correspondent to establish a PSTN communication session, and said first correspondent simultaneously initiating a set-up procedure for a video communication session by sending a request to said call server to determine whether said second correspondent is registered with said call server; and when said second correspondent is registered with said call server determining whether said second correspondent is compatible with said first correspondent based on at least one attribute;

when said second correspondent is compatible with said first correspondent, said call server sending a video communication session invitation to said second correspondent via said IP network; and when said second correspondent accepts said invitation, establishing said video communication session via said IP network between said first correspondent and said second correspondent.

In another of its aspects, there is provided a method for setting up a video communication session via an Internet Protocol (IP) network between a first correspondent and a second correspondent, the method having the steps of:

providing a call server on an IP network, said call server configured to facilitate said video communication session between said correspondents;

assigning a unique identifier to each of said correspondents;

registering said unique identifier and at least one attribute associated with each of said correspondents with a directory on said IP network;

said first correspondent placing a call through a public switched telephone network (PSTN) to said second correspondent to establish a PSTN communication session, and said first correspondent simultaneously initiating a query to said directory to determine said at least one attribute of said second correspondent, and to determine whether said second correspondent is compatible with said first correspondent based on at least one attribute;

when said second correspondent is compatible with said first correspondent, one of said correspondents initiating a video communication session via said call server; and said call server assigning a unique video communication session identifier and establishing said video communication session via said IP network between said correspondents.

In another of its aspects, there is provided an apparatus in a first communication network, said apparatus adapted for a first type of communication via at least one call control protocol in said first communication network, said apparatus comprising:

a unique identifier associated with characteristics of said apparatus;

a processing structure; and a memory including computer program code, wherein said memory and said computer program code are configured, with said processing structure, to cause said apparatus to at least:

initiate a communication session with another apparatus by transmitting a compatibility request to determine whether said other apparatus is compatible to carry out said first type of communication based on characteristics of said other apparatus; and when said other apparatus is compatible, then establish said first type communication between said apparatuses.

Advantageously, compatibility issues are easily resolved as the endpoints exchange their initial credentials via in-band signalling such as DTMF or FSK, thus obviating the need for specialized and time-consuming firewall/NAT traversal techniques. Therefore, the video calls are set up with both endpoints calling out to the public IP network, and since the call is initiated via the PSTN, then the existing E.164 telephone directory can be used.

BRIEF DESCRIPTION OF THE DRAWINGS

Several exemplary embodiments of the present invention will now be described, by way of example only, with reference to the appended drawings in which.

DETAILED DESCRIPTION OF EXEMPLARY EMBODIMENTS

The detailed description of exemplary embodiments of the invention herein makes reference to the accompanying block diagrams and schematic diagrams, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 1:
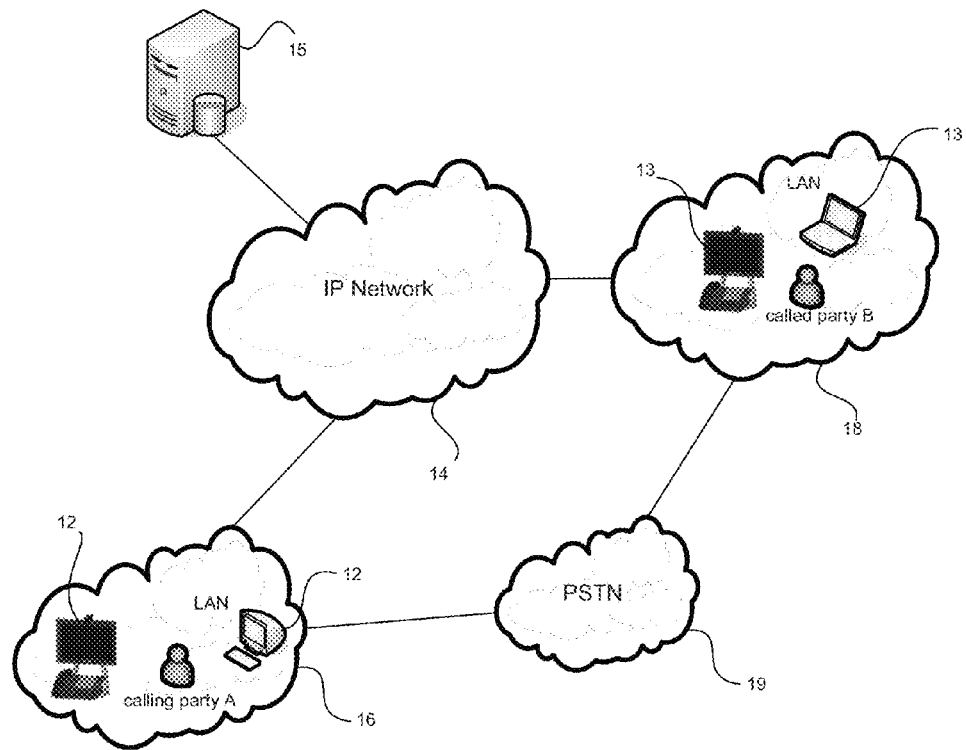
FIG. 1 shows an exemplary video communication system.

Many of the methods of the invention may be performed with a digital processing system, such as a conventional, general purpose computer system. Special purpose computers which are designed or programmed to perform only one function may also be used. FIG. 1 shows an exemplary video communication system, generally identified by reference numeral 10, comprising a plurality of participant computing devices or endpoint terminals 12 and 13 in communication with each other by either wired or wireless connection via a network 14, including a video communication server (VCS) 15 which and is responsible for conference and session management, routing and interworking to facilitate video communication between the devices 12 and 13. In this exemplary embodiment, the network 14 is the Internet, however, the network 14 may alternatively be another network, such as for example, a cellular network, or a mixture of different networks. Device 12 is coupled to a local area network 16, while device 13 is coupled to a local area network 18. Both local area networks 16 and 18 are coupled to the network 14 and a Public Switched Telephone Network (PSTN) 19.

Figure 2:
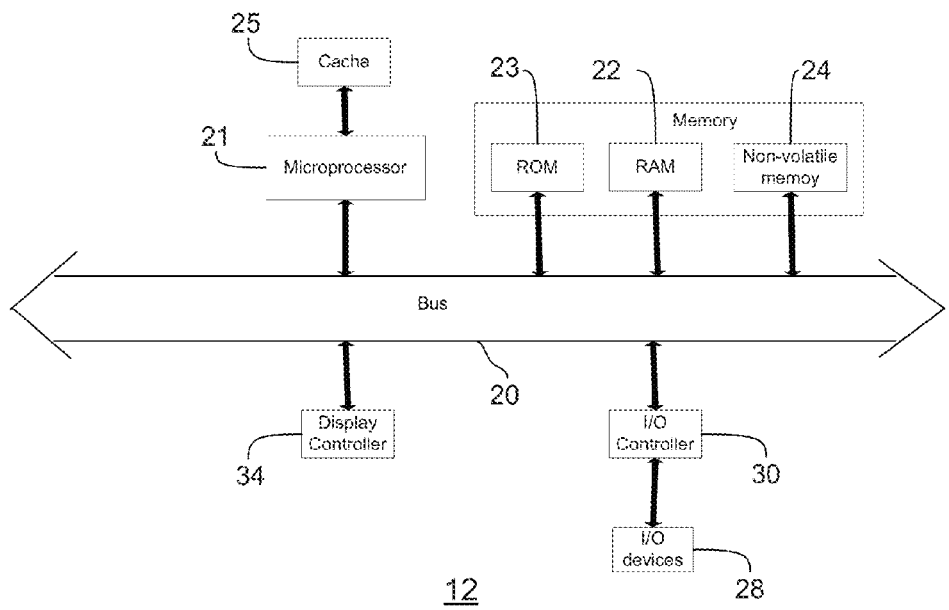
FIG. 2 shows a schematic diagram of an exemplary computing device.

FIG. 2 shows one example of a typical computer system of a device 12 or 13. Note that while FIG. 2 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. As shown in FIG. 2, the computer system, which is a form of a data processing system, includes a bus 20 which is coupled to a microprocessor 21 and machine readable media, ROM 22, volatile RAM 23 and a non-volatile memory 24. The microprocessor 21 is coupled to cache memory 25. The bus 20 interconnects these various components together and also interconnects these components 21, 22, 23, and 24 to a display controller 34 and display device 26 and to peripheral devices such as input/output (I/O) devices 28 which may be mice, keyboards, modems, network interfaces, printers, scanners, video cameras and other devices which are well known in the art. Typically, the input/output devices are coupled to the system through input/output controllers 30. The bus 20 may include one or more buses connected to each other through various bridges, controllers and/or adapters as is well known in the art.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as a machine readable medium, or ROM 22, volatile RAM 23, non-volatile memory 24, cache 25 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 21. The machine readable medium includes any mechanism that provides (i.e., stores and/or transmits) information in a form accessible by a machine (e.g., a computer, network device, personal digital assistant, any device with a set of one or more processors, etc.). For example, machine readable media includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.).

The computing system may be in the form of any kind of general processing structure, and may for example include any device 12, such as, personal computers, laptops, tablets, computer servers, computerized kiosks, personal digital assistants (PDAs), cellular phones, smartphones, videophones, Session Initiation Protocol (SIP)—and H.323-compliant endpoints. The VCS 15 comprises a similar computing system, however, it may further comprise data structures, such as, databases 40.

Figure 3:
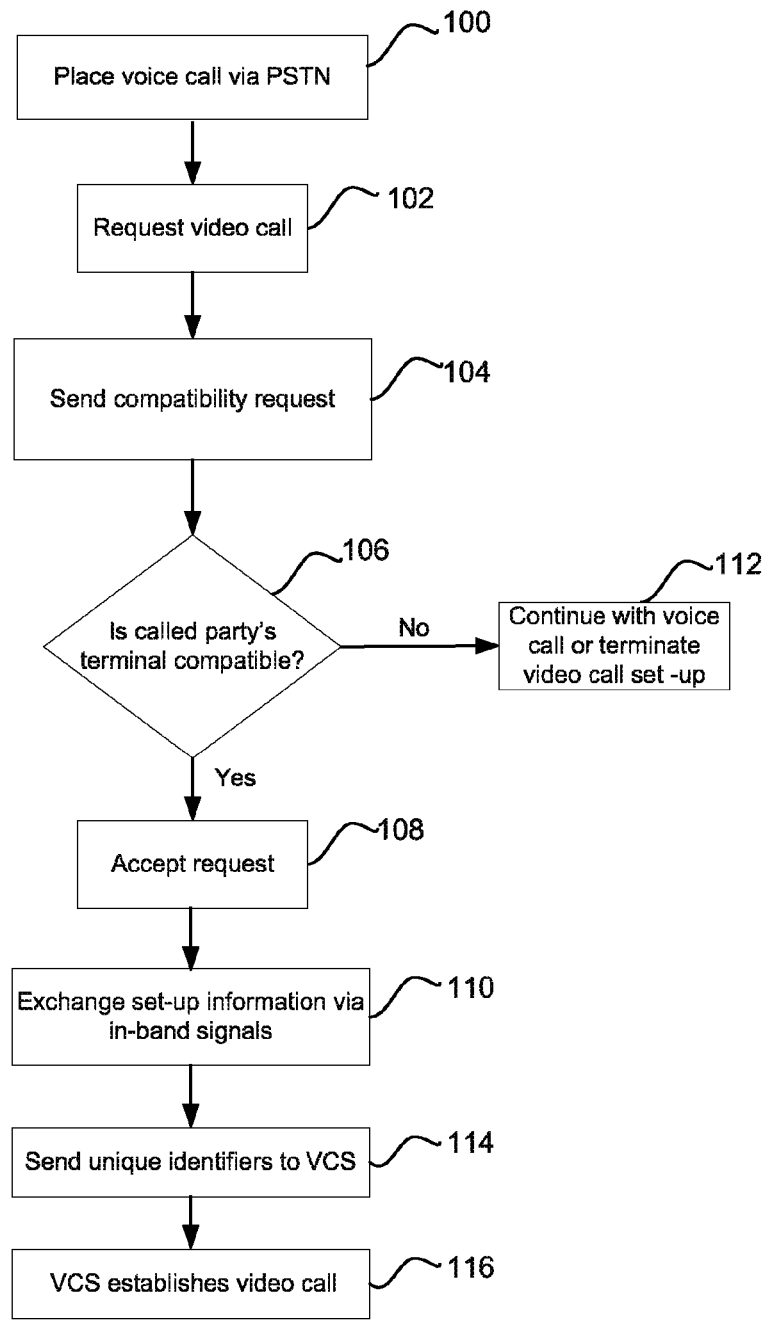
FIG. 3 shows the exemplary steps for setting up a video communication session.

Looking at FIG. 3, there is shown a flow diagram outlining the exemplary steps for setting up a video communication session between two correspondents, such as SIP-compliant endpoints 12, 13, corresponding to calling party (A) and called party (B), respectively. The process starts with the calling party A at terminal 12 placing a traditional audio or voice call through the PSTN 19 (step 100) to a terminal 13 of the called party B. However, calling party (A) has no knowledge of whether terminal 13 associated with called party (B) is capable of video-based communication, or the device characteristics or specifications of terminal 13, such as those related to elements described in FIG. 2, or the call control protocol associated with terminal 13. In fact, terminal 13 may be registered to a different call control protocol to that of terminal 12. Once a voice call is set up via the PSTN 19, and if both parties A and B desire to switch to a video communication session, then one of the parties, such as calling party A, selects this option using a video request button or a voice command via the user interface of terminal 12, to initiate the video communication session (step 102). Accordingly, terminal 12 sends a compatibility request via in-band signals (step 104) to determine whether terminal 13 is compatible, with respect to video handling capabilities, based on the device type, characteristics or specifications of terminal 13 related to FIG. 2 (step 106). When it is determined that terminal 13 is compatible with terminal 12, then called party B is prompted to accept or decline the invitation for a video call (step 108). When called party B accepts the video call invitation, the two terminals 12, 13 exchange information which can be used for setting up the video call (step 110), otherwise the calling party A and party B continue with the voice call, or the call set-up is terminated (step 112). The set-up information includes, but is not limited to, MAC addresses, SIP addresses, telephone numbers, email addresses, and unique identifiers. In this embodiment, the compatibility request and the exchanged information is sent via dual-tone multi-frequency (DTMF) signals or other in-band signals such as frequency-shift keying (FSK). The audio path to the speakers associated with terminal 12 or 13 may be muted for better user experience while these in-band signals are being transmitted. The unique identifiers correspond to each of terminals 12 and 13, and are transmitted to the VCS 15 for registration therewith, and are stored in a computer readable medium or database associated with the VCS 15. The VCS 15 associates the unique identifiers corresponding to each of terminals 12 and 13 with a unique communication session identifier pertaining to the prospective video call. The VCS 15 then couples the two parties A, B via the IP network 14, allowing for a further and more detailed exchange of information, leading to the set-up of an IP video call and the termination of the PSTN connection. The VCS 15 also performs call control protocol translation should the terminals 12, 13 be associated with disparate call control protocols. Accordingly, compatibility issues are resolved as the terminals 12, 13 exchange their initial credentials via in-band signalling such as DTMF or FSK, thus obviating the need for specialized and time-consuming firewall/NAT traversal techniques. Therefore, the video call is set up with both terminals 12, 13 calling out to the public IP network 14, and since the call is initiated via the PSTN 19, then the existing E.164 telephone directory can be used.

Figure 4:
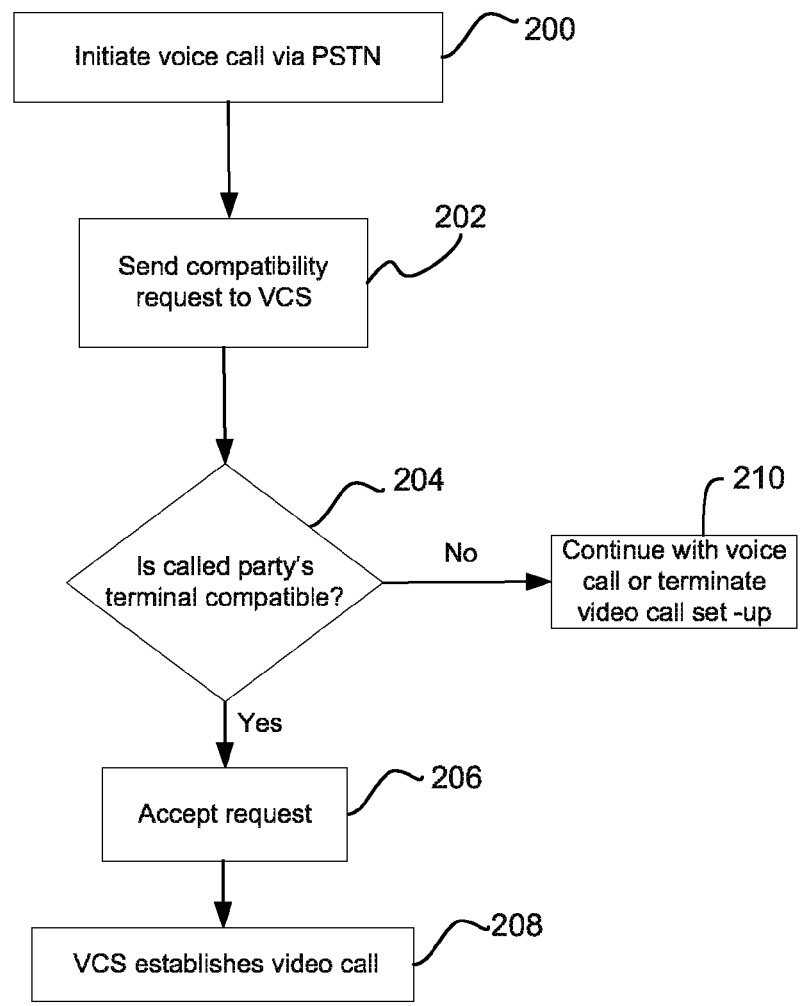
FIG. 4 shows the exemplary steps for setting up a video communication session, in yet another embodiment.

In another exemplary embodiment, the two terminals 12 and 13 are registered with a VCS 15 located on the public Internet 14, as described above. In addition, the characteristics of terminals 12 and 13 are stored and stored in a computer readable medium or database associated with the VCS 15. This registration may be permanent, or temporary, and may be maintained on the VCS 15 for any specific time period, such as the time frame in which either party A or B desires to receive an invitation to participate in a video communication session. In this embodiment, as shown in a flow diagram of FIG. 4, when the calling party A, initiates a voice call via the PSTN 19 (step 200), the terminal 12 of calling party A also initiates a set-up procedure for a video communication session by sending a compatibility request directly to the VCS 15 (step 202) via the IP network 14. The compatibility request from calling party A is a query to the VCS 15 regarding the registration status of called party B, or the capabilities of terminal 13 associated therewith. The VCS 15 then queries its registration database 40 (step 204), and if the VCS 15 receives confirmation that terminal 13 is registered, and has a unique identifier, and is compatible with terminal 12, then the VCS 15 assigns a unique video communication session identifier associated with unique identifiers of each terminal 12 and 13, and sends a video communication session invitation to terminal 13, via the IP network (step 206). Subsequently, if called party B accepts the invitation, a video communication session with calling party A is established directly or indirectly, through the VCS 15 (step 208). Upon successful setup of the IP video connection, the PSTN connection attempt is aborted (if not yet connected) or terminated (if already connected). At step 204, if terminal 13 is not registered on the VCS 15, or is not a compatible with terminal 12, or does not have a unique identifier for the VCS 15, or called party B does not accept the invitation to connect to a video communication session, then calling party A will continue with the PSTN call (step 210).

In yet another embodiment, each of the terminals 12 and 13 is associated with one or more identifying network addresses, such as an E.164 address as defined in the International Telecommunication Union's international public telecommunication numbering plan, available at http://www.itu.int/ITU-T/publications/index.html and hereby incorporated herein by reference in its entirety. Alternatively, in other embodiments, the terminals 12 and 13 are associated with IP addresses, H.323 IDs, SIP URLs, Media Gateway Control Protocol (MGCP) endpoint names, and other network address identifiers known in the art. Accordingly, the terminals 12 and 13 are registered with a directory, such as an E. 164 directory, comprising a unique identifier, a telephone number, and device characteristics or capabilities of each terminal 12 or 13. In this embodiment, when the calling party A initiates a voice call via the PSTN 19 using terminal 12, a query is concurrently sent by the terminal 12 to the E.164 directory, via the IP network, pertaining to the capabilities of terminal 13. If the E.164 directory indicates that terminal 13 is a compatible terminal with a unique identifier, then either party A or B can request a video communication session. If both parties A, B accept, each party A or B then initiates a video communication session with the VCS 15. Next, the VCS 15 assigns a unique video communication session identifier associated with unique identifiers of each terminal 12 and 13, and the video communication session is subsequently established between the two parties A, B, while the PSTN connection is terminated. Advantageously, the requirement for the initial in-band signalling that would be required to exchange the necessary information to set up a video call between both parties A, B is eliminated, and the requirement to mute in-band signals to prevent them from being heard by parties A, B is also obviated.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

The embodiments of the invention in which an exclusive property or privilege is claimed are defined as follows:

1. A method for setting up a video communication session via an Internet Protocol (IP) network between a first correspondent and a second correspondent, the method having the steps of:

providing a call server on an IP network, said call server configured to facilitate said video communication session between said correspondents;

assigning a unique identifier to each of said correspondents;

registering said unique identifier and at least one attribute associated with each of said correspondents with said call server;

said first correspondent placing a call through a public switched telephone network (PSTN) to said second correspondent to establish a PSTN communication session, and said first correspondent simultaneously initiating a set-up procedure for a video communication session by sending a request to said call server to determine whether said second correspondent is registered with said call server; and when said second correspondent is registered with said call server determining whether said second correspondent is compatible with said first correspondent based on at least one attribute;

when said second correspondent is compatible with said first correspondent, said call server sending a video communication session invitation to said second correspondent via said IP network; and when second correspondent accepts said invitation, establishing said video communication session via said IP network between said first correspondent and said second correspondent, wherein said video communication session is established via said call server.

2. The method of claim 1 wherein said PSTN communication session is terminated upon establishment of said video communication session.

3. A method for setting up a video communication session an Internet Protocol (IP) network between a first correspondent and a second correspondent, the method having the steps of:

providing a call server on an IP network, said call server configured to facilitate said video communication session said correspondents;

assigning a unique identifier to each of said correspondents;

registering said unique identifier and at least one attribute associated with each of said correspondents with a directory on said IP network;

said first correspondent placing a call through a public switched telephone network (PTSN) to said second correspondent to establish a PSTN communication session, and said first correspondent simultaneously initiating a query to said directory to determine said at least one attribute of said second correspondent, and to determine whether said second correspondent is compatible with said first correspondent based on at least one attribute;

when said second correspondent is compatible with said first correspondent, one of said correspondents initiating a video communication session via said call server; and said call server assigning a unique video communication session identifier and establishing said video communication session via said IP network between said correspondents.

4. The method of claim 3 wherein said directory is an E. 164 directory.

5. The method of claim 4 wherein said query to said directory is sent via said IP network.

* * * * *